US007076772B2

(12) United States Patent
Zatloukal (10) Patent No.: US 7,076,772 B2
(45) Date of Patent: Jul. 11, 2006

(54) SYSTEM AND METHOD FOR MULTI-LANGUAGE EXTENSIBLE COMPILER FRAMEWORK

(75) Inventor: Kevin Zatloukal, Cambridge, MA (US)

(73) Assignee: BEA Systems, Inc., San Jose, CA (US)

( * ) Notice: Subject to any disclaimer, the term of this patent is extended or adjusted under 35 U.S.C. 154(b) by 0 days.

(21) Appl. No.: 10/782,715

(22) Filed: Feb. 19, 2004

(65) Prior Publication Data

US 2004/0168160 A1   Aug. 26, 2004

Related U.S. Application Data

(60) Provisional application No. 60/449,991, filed on Feb. 26, 2003.

(51) Int. Cl.
*G06F 9/45* (2006.01)
*G06F 9/44* (2006.01)

(52) U.S. Cl. .................. 717/147; 717/141; 717/118

(58) Field of Classification Search ............. 717/156, 717/140, 148, 147, 136, 143, 118, 141; 707/104; 235/375
See application file for complete search history.

(56) References Cited

U.S. PATENT DOCUMENTS

| 5,321,841 | A |   | 6/1994  | East et al. |
|-----------|---|---|---------|-------------|
| 5,748,975 | A |   | 5/1998  | Van De Vanter ............ 715/531 |
| 5,835,769 | A |   | 11/1998 | Jervis et al. ................ 717/113 |
| 5,836,014 | A | * | 11/1998 | Faiman, Jr. ................. 717/156 |
| 5,862,327 | A |   | 1/1999  | Kwang |
| 5,950,010 | A |   | 9/1999  | Hesse |
| 5,961,593 | A |   | 10/1999 | Gabber et al. |
| 6,023,722 | A |   | 2/2000  | Colyer |
| 6,044,217 | A |   | 3/2000  | Brealey et al. ............. 717/107 |
| 6,067,548 | A |   | 5/2000  | Cheng |

(Continued)

FOREIGN PATENT DOCUMENTS

WO   WO 01/90884 A2   11/2001

(Continued)

OTHER PUBLICATIONS

'Introducing Microsoft DotNet', by Christophe Lauer, Jul. 2, 2002, http://web.archive.org/web/20020702162429/http://www.freevbcode.com/ShowCode.asp?ID=2171.*

(Continued)

*Primary Examiner*—Tuan Dam
*Assistant Examiner*—Chih-Ching Chow
(74) *Attorney, Agent, or Firm*—Fliesler Meyer LLP (57) ABSTRACT

To meet the current trend in computer programming, a multi-programming-language compiler system is designed to include a compiler framework which creates a general environment in which to carry out compilation and language modules to encapsulate the details of various programming languages. Such a system makes it easy for tool vendors and end users to adapt to a world where computer programs are written in multiple languages. New language modules may be written that add support for new languages to the compiler framework. It may also be possible to extend existing language modules so that a variant on an existing language may be added to the compiler framework. Such a system may also be adapted to permit several different clients to access detailed language information from the compiler framework. These clients may include a standard command-line shell or a sophisticated multi-language integrated development environment. This description is not intended to be a complete description of, or limit the scope of, the invention. Other features, aspects, and objects of the invention can be obtained from a review of the specification, the figures, and the claims.

55 Claims, 2 Drawing Sheets

U.S. PATENT DOCUMENTS

| | | | |
|---|---|---|---|
| 6,067,623 | A | 5/2000 | Blakely et al. |
| 6,119,149 | A | 9/2000 | Notani |
| 6,141,686 | A | 10/2000 | Jackowski |
| 6,222,533 | B1 | 4/2001 | Notani |
| 6,226,675 | B1 | 5/2001 | Meltzer et al. |
| 6,230,287 | B1 | 5/2001 | Pinard et al. |
| 6,230,309 | B1 | 5/2001 | Turner |
| 6,237,135 | B1 | 5/2001 | Timbol |
| 6,282,711 | B1 | 8/2001 | Halpern |
| 6,324,681 | B1 | 11/2001 | Sebesta |
| 6,338,064 | B1 | 1/2002 | Ault et al. |
| 6,349,408 | B1 | 2/2002 | Smith |
| 6,353,923 | B1 | 3/2002 | Bogle et al. ............... 717/128 |
| 6,393,605 | B1 | 5/2002 | Loomans |
| 6,549,949 | B1 | 4/2003 | Bowman-Amuah |
| 6,594,693 | B1 | 7/2003 | Borwankar |
| 6,604,198 | B1 | 8/2003 | Beckman et al. |
| 6,721,747 | B1 | 4/2004 | Lipkin |
| 6,732,237 | B1 * | 5/2004 | Jacobs et al. ............... 711/119 |
| 6,795,967 | B1 | 9/2004 | Evans et al. |
| 6,799,718 | B1 * | 10/2004 | Chan et al. ................ 235/375 |
| 6,802,000 | B1 | 10/2004 | Greene et al. |
| 6,804,686 | B1 * | 10/2004 | Stone et al. ............ 707/104.1 |
| 6,836,883 | B1 * | 12/2004 | Abrams et al. ............ 717/140 |
| 2002/0016759 | A1 | 2/2002 | Macready et al. |
| 2002/0078365 | A1 | 6/2002 | Burnett et al. |
| 2002/0165936 | A1 | 11/2002 | Alston et al. |
| 2003/0018665 | A1 | 1/2003 | Dovin et al. |
| 2003/0041198 | A1 | 2/2003 | Exton et al. |
| 2003/0046266 | A1 | 3/2003 | Mullins |
| 2003/0110117 | A1 | 6/2003 | Saidenberg et al. |
| 2004/0133660 | A1 | 7/2004 | Junghuber et al. |
| 2004/0225995 | A1 | 11/2004 | Marvin et al. |

FOREIGN PATENT DOCUMENTS

WO    PCT/US04/05427    2/2005

OTHER PUBLICATIONS

"Engineer VAX Ada for a Multi-Language Programming Environment", Charles Z. Mitchell et al., Jan. 1987 ACM SIGPLAN.*

"Multilanguage Programming with Ada in the .Net Environment", Jefferey W. Humphries et al., Dec. 2003, ACM SIGAda.*

"Introducing Microsoft DotNet", by Christophe Lauer, Jul. 2, 2002, http://webarchive.org/web/20020702162429/http://www.freevbcode.com/ShowCode.as;?ID=2171.

Marcello Mariucci, "Enterprise Application Sever Development Environments," University of Stuttgat, Overview, Oct. 10, 2000, p. 1-10.

Sun Microsystems, "IPlanet Application Server 6.0 White Paper," Technical Reference Guide, May 25, 2000, all, fig. On p. 20.

Roman, Ed. And Rickard Oberg, "The Technical Benefits of EJB and J2EE Technologies over COM+ and Windows DNA," Dec. 1999, pp. 3-5, fig. 1.

Hewlett-Packard, "HP Application Server," Technical Guide, version 8.0, 1999-2001, all.

Duvos, E. and Besavos, A., "An Infrastructure for the Dynamic Distribution of Web Applications and Services," Dept. of Computer Science, Boston University, Dec. 2000, pp. 4-12.

* cited by examiner

SYSTEM AND METHOD FOR MULTI-LANGUAGE EXTENSIBLE COMPILER FRAMEWORK

CLAIM OF PRIORITY

This application claims priority from the following application, which is hereby incorporated by reference in its entirety:

U.S. Provisional Application No. 60/449,991, entitled SYSTEMS AND METHODS FOR A MULTI-LANGUAGE EXTENSIBLE COMPILER FRAMEWORK, by Kevin Zatloukal, filed on Feb. 26, 2003.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD OF THE INVENTION

This invention relates in general to the field of software systems, specifically software systems for compiling computer programs.

BACKGROUND

A compiler is a computer program that takes as input a computer program written a source language and produces as output an equivalent computer program written in a target language. It may be designed to translate any source language into any target language. Many compilers, however, are designed to accept only one source and one target language. The source and target languages of these compilers are selected when the compiler is first written. Changing them is nearly impossible and would require a rewrite of virtually the entire compiler.

Recent trends in the computer industry have been towards more complicated computer programs, often written in multiple computer languages. Furthermore, multiple computer languages might appear in a single source file, often with one language nested inside another. Traditional multiple language compilers are not sufficient to deal with this problem. Some of them were designed to deal with multiple languages in a single source file in limited examples, but none of them deal with the problem in a general way. Furthermore, such compilers cannot be easily extended to support new languages or new combinations of languages in a source file.

The demands on compilers are increasing in other ways as well. In the past a compiler was designed to serve a single client, typically command line interface, to perform batch compilation of a group of files. Modern compilers are facing more diverse clients which require far more detailed information from compiler. These clients include the traditional batch mode user interfaces as well as integrated development environments.

DETAILED DESCRIPTION

The invention is illustrated by way of example and not by way of limitation in the figures of the accompanying drawings in which like references indicate similar elements. It should be noted that references to "an " or "one " embodiment in this disclosure are not necessarily to the same embodiment, and such references mean at least one.

Figure 1:
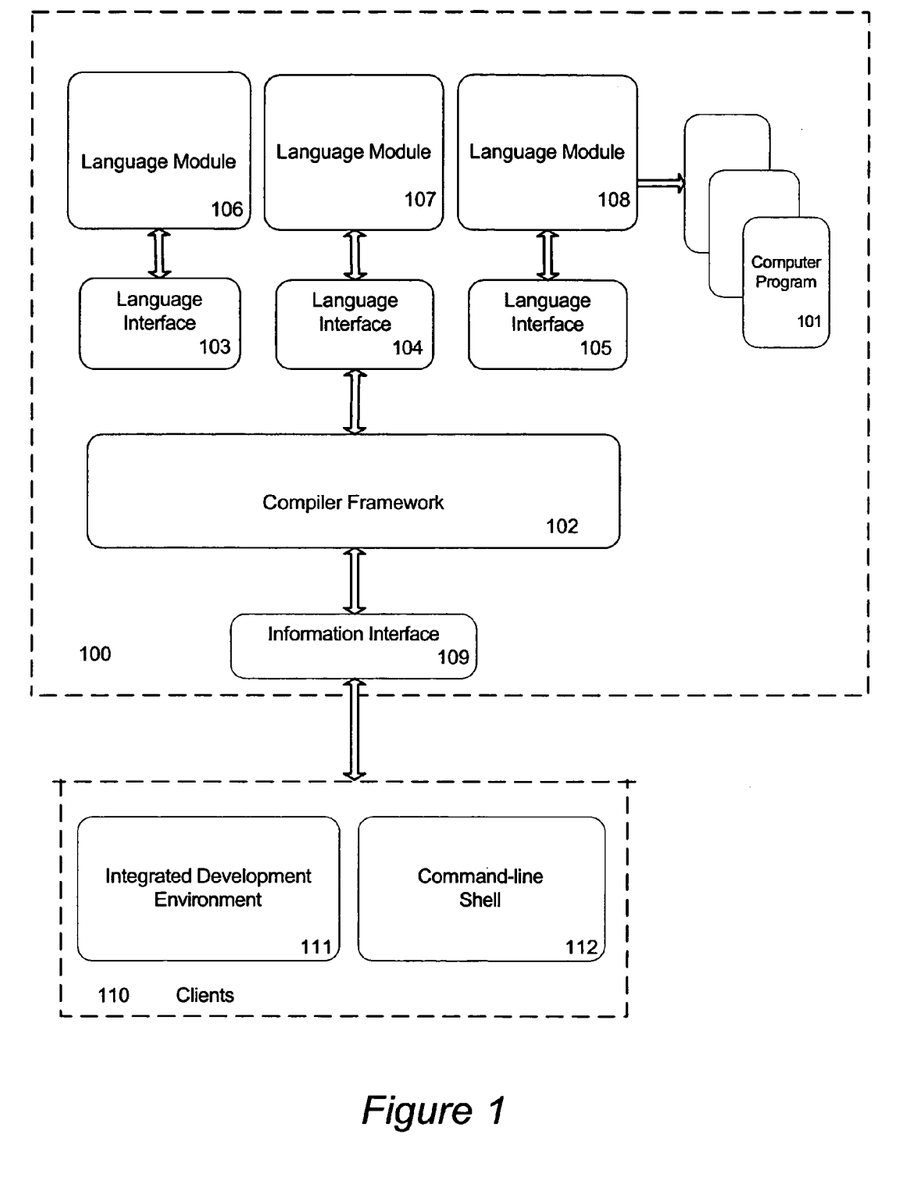
FIG. 1 is a diagram showing a multi-programming-language compiler system that can be used in accordance with one embodiment of the present invention.

One embodiment of the present invention provides a system and method for creating a compiler system 100 as shown in FIG. 1 that allows the compilation of multiple languages written in a computer program 101 and can be easily extended to add new languages. It consists of a compiler framework 102, which creates a general environment in which to carry out compilation, a plurality of language modules such as 103 to encapsulate the details of various programming languages, and a plurality of language interfaces such as 106 provided by each language module to interact with the compiler framework. In order to compile a program, the compiler framework and the language modules operate together to execute the compilation process. The compiler framework controls the compilation process and performs a standard language-independent portion of the compilation process and each language module provides a language-dependent portion of the compilation process for a particular programming language. Such a system makes it easy for tool vendors and end users to adapt to a world where computer programs are written in multiple languages. New language modules may be written that add support for new languages to interact with the compiler framework. It may also be possible to extend existing language modules so that a variant on an existing language may be added to the compiling system.

One embodiment of the present invention may be adapted to permit one or more clients 110 to interact with the compiler system through an information interface 109 in order to request services and obtain detailed language information from the compiler framework. These clients may include a standard command-line shell 112 or a sophisticated multi-language integrated development environment (IDE) 111. Information from the language modules and the compiler framework may be passed through to the various clients in a language-neutral way.

The compiler framework in accordance with one embodiment of the present invention is responsible for performing services that are not highly specific to any one programming language in the computer program. In some embodiments of this invention the compiler framework may be tailored for a particular environment such as the Java environment. In such a circumstance, the compiler framework may provide services that are more useful for Java-like programming language, but it does not mean that the compiler framework will become language-dependent.

In one embodiment, a computer program 101 that is compiled by the compiler system may be organized into projects. A project may include at least one set of files, paths, libraries, configuration information, and dependencies of files. Such information may be maintained and used by the compiler framework to direct the compilation process. In an embodiment in the Java environment a project might include a list of class files, Java files, JAR files, and a set of Java classpaths.

In one embodiment the compiler framework is responsible for controlling the overall compilation process for a computer program. The phases of the compilation process may be defined by the compiler framework and may include scanning, parsing, name resolution, semantic checking, and code generation. The compiler framework may control the invocation of these phases by calling functions on an interface provided by the language modules.

The compiler framework in accordance with one embodiment of the present invention may maintain a type cache to store types defined in the files of the project. This type cache may allow types defined in different languages to be intermixed and may allow types defined in one programming language to reference types defined in another programming language. In an embodiment for the Java environment, this type cache may maintain a hierarchical structure mirroring the package structure of the Java project. The type cache may also requires types defined in different programming languages to be mapped to the type system of one particular programming language, such as the Java programming language. In one embodiment, the type cache may contain all the public information about a particular source file so that another source file may be type checked using only the information contained in the type cache.

A type cache may also store dependencies between the types it stores. A dependency represents the fact that one type may depend in some way on the structure of another type. The compiler framework may also maintain a list of reverse dependencies, making it efficient to determine what other types may be affected if a particular type is changed. The type cache may be serialized to disk so that it does not have to be regenerated when the compiler framework is shut down and restarted.

The compiler framework may also include a list of errors. In embodiments that organize computer programs into projects and files, the set of errors may include errors for the entire project and errors for each source file in the project. The errors may also include one or more suggestions for correcting the errors, which may be provided by the language modules or the compiler framework.

The compiler framework in accordance with one embodiment of the present invention may also provide a multi-threading service which may be used by the compiler framework and the language modules. The multi-threading service may include a thread pool with multiple worker threads capable of being assigned to independent tasks. The multi-threading service may also include a facility for including dependencies between the worker threads so that one worker thread may wait on the completion of a second worker thread.

While the compiler framework is programming language independent, it may be tailored for a particular programming language environment. In one embodiment, the compiler framework may be tailored to the Java programming environment. In this embodiment, the compiler framework may organize use a project system that includes the Java package structure. The compiler framework may also utilize a Java-like type system for all its programming languages. The framework may also provide a module for code generation that uses Java as an intermediate language.

In one embodiment, the compiler framework may interact with a particular language module through a standard language interface that every language module must implement. This interface might provide functions allowing the compiler framework to access various components that perform different phases of compilation and it may also allow the compiler framework to get language specific information about the source files that have been compiled.

In one embodiment, the language interface may present the language-dependent portion of the compilation process in the form of a set of components, each component performing one of the standard phases of compilation. These phases may include a scanning phase, a parsing phase, a name resolution phase, a semantic checking phase, and a code generation phase.

In one embodiment, the language interface allows one language module to interact with another language module to provide services for compilation of nested languages. Language nesting occurs when a section of source code written in an inner language appears within the source code of an outer language. One family of nested languages consists of the Java annotation languages, where Java is the outer language and the inner language appears within Java comments. The language interface allows one language module to invoke another language module in order to compile a nested language. The outer language may identify the start of a nested language using any information generated during compilation or it may allow the inner language to make the determination. Either the inner or the outer language may determine where the nested language ends.

In one embodiment, the language interface may include functions for retrieving information about a particular source file. These interfaces may provide various types of information that can be used by various clients of the compiler framework. In an embodiment where an integrated development environment (IDE) is a client of the compiler framework, this information may be useful for providing various editing features for the language. In such an embodiment this information may include: information about matching tokens, the list of tokens for a particular source file or a particular portion of a source file, code completion information, or language nesting information.

A language module is the mechanism by which the compiler framework is extended. A language module should encapsulate the knowledge about a particular programming language and present a standard language interface to the compiler framework. A language module controls the portions of the compilation process that require specific knowledge of a programming language. Language modules may be provided by the developer of the compiler framework, by independent vendors, or by an end user.

In one embodiment, one of the language modules might be a language module for the Java language. This Java language module would include several components which have specific knowledge of the Java language. These components might include: a scanner, a parser, a name resolver, a semantic checker, and a code generator each of which has a detailed understanding of part of the structure of the Java language. These components would be invoked by the compiler framework in the necessary order to perform compilation of a Java file.

In one embodiment, one language module may be able to extend another language module in order to easily create a new programming language. For instance, a language like Java could be given extra semantics that are not present in the original language. In embodiments where the language modules provide separate components for each phase of compilation such a language could be implemented by extending the components for various phases of compilation and reusing components that don't require changes. Such a facility might also be useful for implementing the multitude of languages related to XML. XML languages usually preserve the basic syntax of XML but add extra semantic requirements. These languages can be implemented quickly and still benefit from the facilities based on the XML language module.

Figure 2:
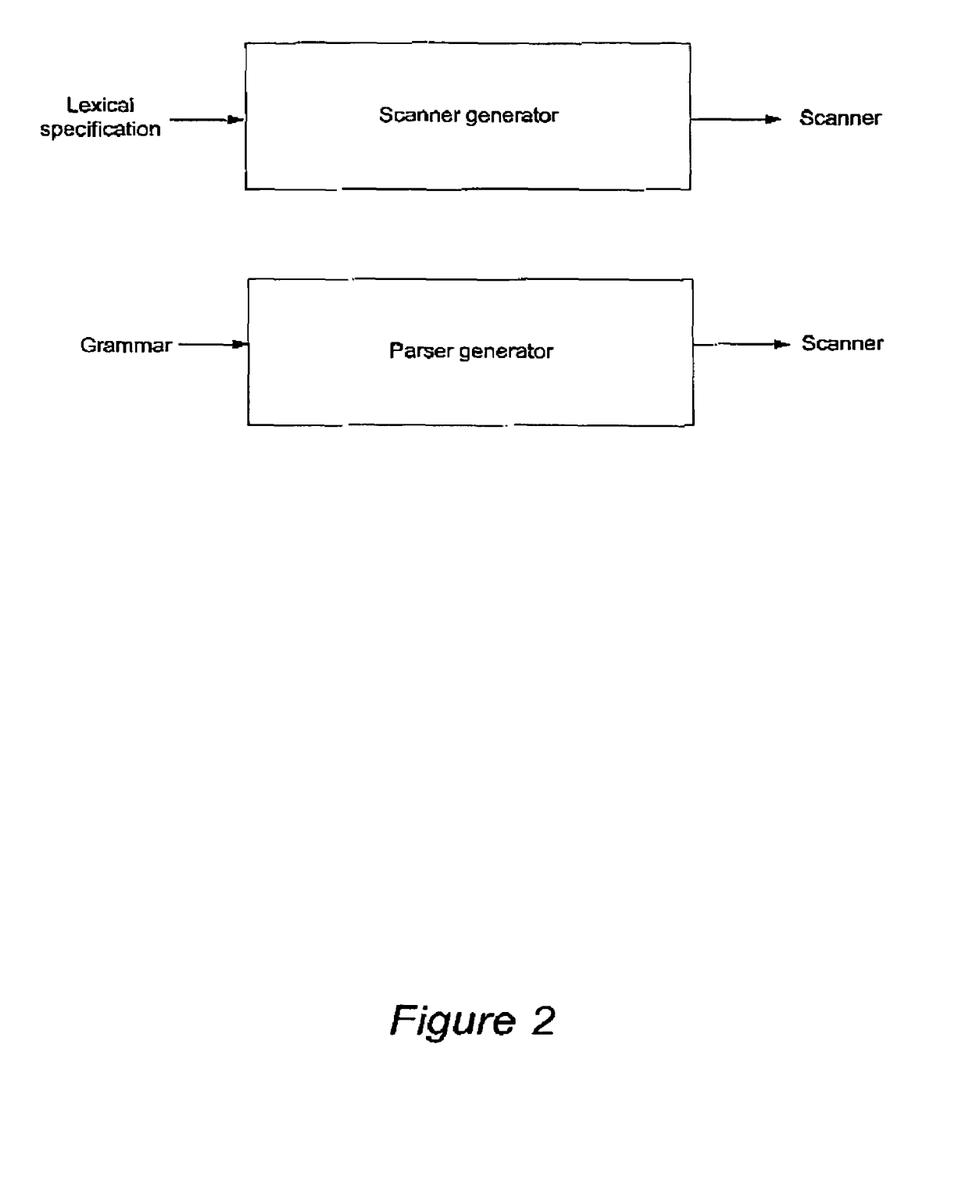
FIG. 2 is a diagram of a scanner and parser generator for use in creating scanners and parsers that can be used in accordance with one embodiment of the present invention.

In one embodiment, the invention may include tools to speed the development of language modules. These tools may automate the creation of common tasks. In particular, automatic generators are common in the art for both parsers and scanners and these tools can make the development of simple languages very rapid. As shown in FIG. 2, scanner generators are given a lexical specification, which defines the types of tokens allowed in a particular language and produce code for generating scanners. Likewise, parser generators, also shown in FIG. 2, take a grammar for a programming language and produce a parser that recognizes that grammar. Tools provided with the compiler framework may automatically create components that are compatible with the compiler framework and provide proper interfaces on those components. Tools provided with the compiler framework may also implement robust error correction mechanisms so that the created language modules are suitable for use with all clients.

The compiling system may provide interfaces to provide services and information to various clients. A client may require information about a particular source file or a project. A client may also invoke the compilation of a particular source file or an entire project. A client may also wish to change source files and notify the compiler framework that the source files have changed.

In one embodiment the client may be an integrated development environment (IDE) which allows a developer to work on a project. These facilities may rely on the compiler network to obtain information about the project. The IDE may include facilities for examining the contents of a project, including browsing the files in a project or browsing the class hierarchy in the project. The IDE may also include an error display for showing the errors in the project.

In an embodiment that includes an IDE, the IDE may include a source code editor that allows the user to edit source files that are part of the project. The source code editor may wish to request language information about various portions of the source code from the compiling system. This information may be provided by the compiler framework or by the language modules directly.

A source code editor in an IDE may be adapted to edit source files containing nested languages. The source code editor may request information about the start and end of nested languages from the compiler framework, as well as information about the various different languages in the source file.

In an interactive embodiment, the compiler framework might provide an interface allowing clients to inform the compiler framework that the files in the project have changed. The compiler framework may subsequently recompile the changed files and any files that depend on them, by obtaining dependency information from the type cache which may be maintained by the compiler framework.

In another embodiment the client may be a command-line shell. This shell may request that the compiler framework compile a set of files and produce an executable or a library. If the compilation fails, the shell may request a list of errors from the compiler framework so it can display them to the user on the console.

According to the teachings of the present invention, a software system is created that allows for a compiler that supports both multiple languages and multiple clients. The present system allows for the relatively easy addition of support for new programming languages. Such a system allows for the creation of a flexible development environment that is suitable to the needs of modem programmers who are often working in multiple programming languages and frequently end up creating new programming languages in order to satisfy the requirements of their current project.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A system operable to perform a multi-programming-language compilation process on a computer program written in one or more computer programming languages, comprising:

a compiler framework operable to perform a programming language-independent portion of the compilation process on the computer program;

a plurality of language modules, wherein each language module is operable to perform programming language-dependent portion of the compilation process on one of the one or more computer programming languages in the computer program and/or invoke another language module in the plurality of language modules via one of a plurality of language interfaces; and said plurality of language interfaces, wherein each language interface is provided by one of the plurality of language modules to interact with the compiler framework and/or other language modules.

2. The system of claim 1, wherein:
a multi-threading service is used by the compiler framework and the plurality of language modules.

3. The system of claim 1, wherein:
the system can be tailored for Java® programming language.

4. The system of claim 1, wherein:
the computer program is organized into a project, which may contain at least one set of the following: files, paths, libraries, configuration information, and dependencies among files.

5. The system of claim 4, further comprising a type cache operable to:
store types defined in the set of files in the project;
store dependencies between the types it stores; and
allow types defined in one programming language to reference types defined in another programming language.

6. The system of claim 4, wherein:
the programming language-independent portion of the compilation process comprises at least one of the following phases:
managing the set of files in the project;
persisting the set of paths files in the project;
maintaining the set of dependencies in the project;
acquiring configuration information files in the project; and
maintaining a list of errors related to the project.

7. The system of claim 1, wherein:
the programming language-dependent portion of the compilation process comprises at least one of the following phases:
performing scanning;
performing parsing;
performing name resolution;
performing semantic checking; and
performing code generation.

8. The system of claim 7, wherein:
a language interface of the plurality of language interfaces can be configured to present each language module in the form of a set of components, wherein each component is configured to perform one phase of the language-dependent portion of the compilation process.

9. The system of claim 1, wherein:
a language interface of the plurality of language interfaces can include functions for retrieving information about a particular file in the computer program.

10. The system of claim 1, wherein:
a language interface of the plurality of language interfaces can be configured to allow a first language module of the plurality of language modules to interact with a second language module of the plurality of language modules.

11. The system of claim 10, wherein:
the language interface is operable to accept nested languages, allowing the first language module to request the compilation of a specified portion of the computer program using the second language module.

12. The system of claim 1, wherein:
at least one language module of the plurality of language modules is for Java® programming language.

13. The system of claim 1, wherein:
a second language module of the plurality of language modules extends a first language module of the plurality of language modules to provide a new language which is an extended version of a programming language compiled by the first language module.

14. The system of claim 1, further comprising:
a tool to speed the development of the plurality of language modules.

15. A system operable to perform a multi-programming-language compilation process on a computer program written in one or more computer programming languages, comprising:
a compiler framework operable to perform a language-independent portion of the compilation process on the computer program;
a plurality of language modules, each language module in the plurality of language modules is operable to:
perform a language-dependent portion of a compilation process on one of the one or more computer programming languages in the computer program;
provide language information about the computer program; and
invoke another language module in the plurality of language modules via a language interface;
an information interface operable to permit each client in a plurality of clients to interact with the compiler framework;
a plurality of clients operable to utilize the information interface to request the compiler framework to perform at least one of the following tasks:
obtaining the language information produced by the plurality of language modules; and
requesting a service provided by the compiler framework.

16. The system of claim 15, wherein the plurality of clients comprise:
an integrated development environment (IDE) for developing a computer program wherein the IDE uses the language information from the compiler framework to provide language features based on that information; and
a command-line interface for causing the compilation of the computer program and displaying any errors in the computer program.

17. The system of claim 16, wherein:
the IDE may include a source code editor to edit files in the computer program.

18. The system of claim 15, wherein:
the information interface is further operable to allow a client to inform the compiler network of file changes; and
the compiler network is operable to recompile the changed files and other files depend on them.

19. A method operable to perform a multi-programming-language compilation process on a computer program written in one or more computer programming languages, comprising:
utilizing a compiler framework operable to perform a programming language-independent portion of the compilation process on the computer program;
invoking a plurality of language modules, wherein each language module is operable to perform a programming language-dependant portion of the compilation process on one of the one or more computer programming languages in the computer program and/or invoke another language module in the plurality of language modules via one of a plurality of language interfaces; and
providing said plurality of language interfaces, wherein each language interface is operable to allow one of the plurality of language modules to interact with the compiler framework and/or other language modules.

20. The method of claim 19, further comprising:
using a multi-threading service during the compilation process.

21. The method of claim 19, further comprising:
tailoring the compilation process for Java® programming language.

22. The method of claim 19, wherein:
the computer program is organized into a project, which may contain at least one set of the following: files, paths, libraries, configuration information, and dependencies among files.

23. The method of claim 22, further comprising:
utilizing a type cache operable to:
store types defined in the set of files in the project;
store dependencies between the types it stores; and
allow types defined in one programming language to reference types defined in another programming language.

24. The method of claim 22, wherein:
the programming language-independent portion of the compilation process comprises at least one of the following phases:
managing the set of files in the project;
persisting the set of paths files in the project;
maintaining the set of dependencies in the project;
acquiring configuration information files in the project; and
maintaining a list of errors related to the project.

25. The method of claim 19, wherein:
the programming language-dependent portion of the compilation process comprises at least one of the following phases:
performing scanning;
performing parsing;
performing name resolution;
performing semantic checking; and
performing code generation.

26. The method of claim 25, further comprising:
presenting each language module in the form of a set of components, wherein each component is configured to perform one phase of the language-dependent portion of the compilation process.

27. The method of claim 19, further comprising:
Retrieving information about a particular file in the computer program via a language interface of the plurality of language interfaces.

28. The method of claim 19, further comprising:
allowing a first language module of the plurality of language modules to interact with a second language module of the plurality of language modules.

29. The method of claim 28, wherein:
the first language module is operable to request the compilation of a specified portion of the computer program using the second language module.

30. The method of claim 19, wherein:
at least one language module of the plurality of language modules is for Java® programming language.

31. The method of claim 19, further comprising:
extending a first language module of the plurality of language modules using a second language module of the plurality of language modules to provide a new language which is an extended version of a programming language compiled by the first language module.

32. The method of claim 19, further comprising:
adopting tools to speed up the development of the plurality of language modules.

33. A method operable to perform a multi-programming-language compilation process on a computer program written in one or more computer programming languages, comprising:
utilizing a compiler framework operable to perform a language-independent portion of the compilation process on the computer program;
invoking a plurality of language modules, each language module in the plurality of language modules is operable to:
perform a language-dependent portion of a compilation process on one of the one or more computer programming languages in the computer program;
provide language information about the computer program; and
invoke another language module in the plurality of language modules via a language interface;
including a plurality of clients operable to utilize the information interface to request the compiler framework to perform at least one of the following tasks:
obtaining the language information produced by the plurality of language modules; and
requesting a service provided by the compiler framework.

34. The method of claim 33, wherein the plurality of clients comprise:
an integrated development environment (IDE) for developing a computer program wherein the IDE uses the language information from the compiler framework to provide language features based on that information; and
a command-line interface for causing the compilation of the computer program and displaying any errors in the computer program.

35. The method of claim 34, further comprising:
Including a source code editor in the IDE to edit files in the computer program.

36. The method of claim 33, further comprising:
allowing a client to inform the compiler network of file changes; and
recompiling the changed files and other files depend on them.

37. A computer readable medium having instructions stored thereon that when executed by a processor cause a system to:
perform a multi-programming-language compilation process on a computer program written in one or more computer programming languages, comprising:
utilizing a compiler framework operable to perform a programming language-independent portion of the compilation process on the computer program;
invoking a plurality of language modules, wherein each language module is operable to perform a programming language-dependant portion of the compilation process on one of the one or more computer programming languages in the computer program and/or invoke another language module in the plurality of language modules via one of a plurality of language interfaces; and
providing said plurality of language interfaces, wherein each language interface is operable to allow one of the plurality of a language modules to interact with the compiler framework and/or other language modules.

38. The computer readable medium of claim 37, further comprising instructions that when executed cause the system to:

use a multi-threading service during the compilation process.

39. The computer readable medium of claim 37, further comprising instructions that when executed cause the system to:
tailor the compilation process for Java® programming language.

40. The computer readable medium of claim 37, wherein:
the computer program is organized into a project, which may contain at least one set of the following: files, paths, libraries, configuration information, and dependencies among files.

41. The computer readable medium of claim 40, further comprising instructions that when executed cause the system to:
utilize a type cache operable to:
store types defined in the set of files in the project;
store dependencies between the types it stores; and
allow types defined in one programming language to reference types defined in another programming language.

42. The computer readable medium of claim 40, further comprising instructions that when executed cause the system to:
perform the programming language-independent portion of the compilation process in at least one of the following phases:
managing the set of flies in the project;
persisting the set of paths files in the project;
maintaining the set of dependencies in the project;
acquiring configuration information files in the project; and
maintaining a list of errors related to the project.

43. The computer readable medium of claim 37, further comprising instructions that when executed cause the system to:
perform the programming language-dependent portion of the compilation process in at least one of the following phases:
performing scanning;
performing parsing;
performing name resolution;
performing semantic checking; and
performing code generation.

44. The computer readable medium of claim 43, further comprising instructions that when executed cause the system to:
present each language module in the form of a set of components, wherein each component is configured to perform one phase of the language-dependent portion of the compilation process.

45. The computer readable medium of claim 37, further comprising instructions that when executed cause the system to:
retrieve information about a particular file in the computer program via a language interface of the plurality of language interfaces.

46. The computer readable medium of claim 37, further comprising instructions that when executed cause the system to:
allow a first language module of the plurality of language modules to interact with a second language module of the plurality of language modules.

47. The computer readable medium of claim 37, wherein:
the first language module is operable to request the compilation of a specified portion of the computer program using the second language module.

48. The computer readable medium of claim 37, wherein:
at least one language module of the plurality of language modules is for Java® programming language.

49. The computer readable medium of claim 37, further comprising instructions that when executed cause the system to:
extend a first language module of the plurality of language modules using a second language module of the plurality of language modules to provide a new language which is an extended version of a programming language compiled by the first language module.

50. The computer readable medium of claim 37, further comprising instructions that when executed cause the system to:
adopt tools to speed up the development of the plurality of language modules.

51. A computer readable medium having instructions stored thereon that when executed by a processor cause a system to:
perform a multi-programming-language compilation process on a computer program written in one or more computer programming languages, comprising:
utilize a compiler framework operable to perform a language-independent portion of the compilation process on the computer program;
invoke a plurality of language modules, each language module in the plurality of language modules is operable to:
perform a language-dependent portion of a compilation process on one of the one or more computer programming languages in the computer program provide language information about the computer program; and
invoke another language module in the plurality of language modules via a language interface;
provide an information interface operable to permit each client in a plurality of clients to interact with the compiler framework;
include a plurality of clients operable to utilize the information interface to request the compiler framework to perform at least one of the following tasks:
obtaining the language information produced by the plurality of language modules; and
requesting a service provided by the compiler framework.

52. The computer readable medium of claim 51, wherein the plurality of clients comprise:
an integrated development environment (IDE) for developing a computer program wherein the IDE uses the language information from the compiler framework to provide language features based on that information; and
a command-line interface for causing the compilation of the computer program and displaying any errors in the computer program.

53. The computer readable medium of claim 52, further comprising instructions that when executed cause the system to:
Include a source code editor in the IDE to edit files in the computer program.

54. The computer readable medium of claim 51, further comprising instructions that when executed cause the system to:
allow a client to inform the compiler network of file changes; and
recompile the changed files and other files depend on them.

55. A system operable to perform a multi-programming-language compilation process on a computer program written in one or more computer programming languages, comprising:

means to utilize a compiler framework operable to perform a programming language-independent portion of the compilation process on the computer program;

means to invoke a plurality of language modules, wherein each language module is operable to perform a programming language-dependant portion of the compilation process on one of the one or more computer programming languages in the computer program and/or invoke another language module in the plurality of language modules via one of a plurality of language interfaces; and     means to provide said plurality of language interfaces, wherein each language interface is operable to allow one of the plurality of language modules to interact with the compiler framework and/or other language modules.

\* \* \* \* \*

UNITED STATES PATENT AND TRADEMARK OFFICE
CERTIFICATE OF CORRECTION

PATENT NO. : 7,076,772 B2 Page 1 of 1
APPLICATION NO. : 10/782715
DATED : July 11, 2006
INVENTOR(S) : Kevin Zatloukal

It is certified that error appears in the above-identified patent and that said Letters Patent is hereby corrected as shown below:

Column 10:
Line 62, delete "a language" and insert --language--.

Column 11:
Line 28, delete "flies" and insert -- files--.

Signed and Sealed this

Twelfth Day of December, 2006

JON W. DUDAS
*Director of the United States Patent and Trademark Office*